D. C. SUMNER.
Fabric.
No. 9,266. Reissued June 29, 1880.
Fig: 1.
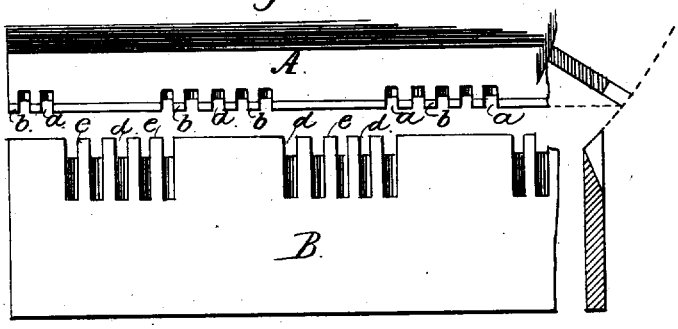
Fig: 2.
Fig: 3.
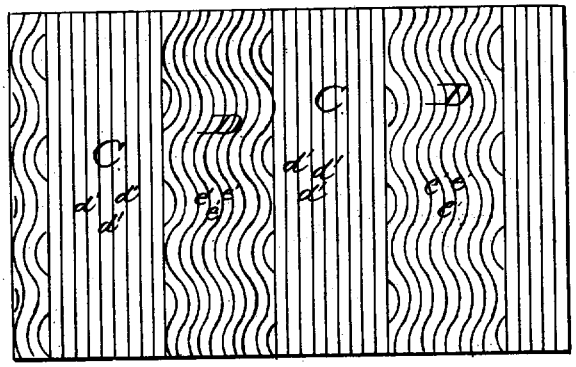
Witnesses:
John C. Tunbridge
Willy G. Schultz.
Inventor:
D. C. Sumner
by his attorney
A. V. Briesen
N. PETERS, PHOTO-LITHOGRAPHER, WASHINGTON, D. C.

UNITED STATES PATENT OFFICE.

DWIGHT C. SUMNER, OF MILLBURY, MASSACHUSETTS.

FABRIC.

SPECIFICATION forming part of Reissued Letters Patent No. 9,266, dated June 29, 1880.

Original No. 203,388, dated May 7, 1878. Application for reissue filed February 14, 1880.

DIVISION B.

*To all whom it may concern:*

Be it known that I, DWIGHT C. SUMNER, of Millbury, in the county of Worcester and State of Massachusetts, have invented a new and Improved Fabric, of which the following is a specification.

This invention relates to a fabric having surface ornamentation produced by shearing or cutting patterns or figures in the nap, pile, or surface fibers.

Heretofore nap or piled fabrics having grooves or furrows cut into the nap or pile by the action of shearing mechanism had such grooves or furrows cut into the nap or pile in uniform manner over the entire surface of the fabric.

The object of my invention is to furnish a fabric having two distinct and dissimilar species of stripes, grooves, or furrows alternating with each other.

In the accompanying drawings, Figure 1 represents a portion of one of the revolver or cylinder blades of the machine, by which the ornamentation of the fabric is produced; also a cross-section thereof. Fig. 2 represents a portion of the ledger-blade in face view and a cross-section thereof, and Fig. 3 represents the improved fabric.

I will first briefly describe the main parts of a machine for producing the new fabric, which machine, however, does not constitute part of the invention here claimed.

Referring to the drawings, A represents the revolver or cylinder blade, having notches *a* and cutting-sections *b*; and B represents the ledger-blade, having notches *d* and cutting-sections *e*, the cutting-sections of the blade A being opposite blank or unnotched spaces on blade B, and vice versa.

The mode of operation of the revolver or cylinder blades and the ledger-blade and their relative arrangement and constructions are fully described in my application for a patent on cloth-finishing machines bearing even date herewith, and marked "Division A."

In Fig. 3 is shown the improved fabric. The surface of this fabric has its nap, pile, or surface fibers sheared off, so as to form two entirely dissimilar lines or sections, C D, of surface ornamentation, alternating with each other on the same fabric. One of these lines or sections, C, is in the drawings shown to consist of parallel grooves or furrows *d′ d′*, &c., and the other, D, is shown to be composed of zigzag or undulating parallel grooves or furrows *e′ e′*, &c. The two sections of ornamentation alternate with each other.

The form or configuration of the grooves, stripes, or furrows in the sections C D may be variously changed in pattern or style, as I do not confine myself to any particular form or configuration of pattern or ornamentation of the alternating sections so long as they are different one from the other alternately.

I claim—

1. As a new article of manufacture, a fabric having two distinct, dissimilar, and alternating series, C D, of stripes shorn off its surface nap, substantially as described.

2. A fabric having straight grooves or furrows *d′*, alternating with undulating or zigzag grooves or furrows *e′*, shorn out of the nap, pile, or surface fibers of the fabric, substantially as specified.

DWIGHT C. SUMNER.

Witnesses:

ISAAC D. GOULDING,
GEORGE W. PARSONS.